US 11,649,033 B2

(12) United States Patent
Vukosav et al.

(10) Patent No.: US 11,649,033 B2
(45) Date of Patent: May 16, 2023

(54) COMPRESSION CHORD FOR A FUSELAGE

(71) Applicant: The Boeing Company, Chicago, IL (US)

(72) Inventors: Danilo Vukosav, Kirkland, WA (US); Mark R. McLaughlin, Snohomish, WA (US); Daniel J. Cox, Seattle, WA (US); Jeff S. Hollowell, Everett, WA (US); Steven D. Ingham, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 295 days.

(21) Appl. No.: 16/716,328

(22) Filed: Dec. 16, 2019

(65) Prior Publication Data
US 2021/0179250 A1 Jun. 17, 2021

(51) Int. Cl.
B64C 1/10 (2006.01)
B64C 1/06 (2006.01)
B64C 1/18 (2006.01)

(52) U.S. Cl.
CPC ............... B64C 1/10 (2013.01); B64C 1/064 (2013.01); B64C 1/068 (2013.01); B64C 1/069 (2013.01); B64C 1/18 (2013.01)

(58) Field of Classification Search
CPC .. B64C 1/10; B64C 1/064; B64C 1/18; B64C 1/068; B64C 1/069
See application file for complete search history.

(56) References Cited

U.S. PATENT DOCUMENTS

2005/0210820 A1* 9/2005 Tanaka ................... B64C 1/064
                                                    52/846
2008/0173765 A1   7/2008 Muller et al.
2009/0283637 A1  11/2009 Nolla
                 (Continued)

FOREIGN PATENT DOCUMENTS

CN    107891965 A    4/2018
EP      2676787 A1  12/2013
              (Continued)

OTHER PUBLICATIONS

Machine Translation of FR 3049928A1. (Year: 2017).*
(Continued)

Primary Examiner — Brian Handville
(74) Attorney, Agent, or Firm — Jordan IP Law, LLC

(57) ABSTRACT

A fuselage for an aircraft includes a pressure deck assembly extending along a roll axis of the fuselage. The pressure deck assembly includes longitudinal beams and a pressure deck. The longitudinal beams extend lengths along the roll axis of the fuselage. The pressure deck extends between the longitudinal beams along the lengths of the longitudinal beams. The pressure deck is compliant along a pitch axis of the fuselage. The fuselage includes a bulkhead extending along a yaw axis of the fuselage. The bulkhead is joined to the pressure deck assembly at a corner joint. The fuselage includes a compression chord extending a length along the pitch axis of the fuselage. The compression chord is joined between the pressure deck assembly and the bulkhead at the corner joint such that the compression chord extends on an outside of the corner joint.

20 Claims, 8 Drawing Sheets

(56) References Cited

U.S. PATENT DOCUMENTS

| | | | | |
|---|---|---|---|---|
| 2010/0200697 A1* | 8/2010 | Sankrithi | ............... | B64C 1/068 |
| | | | | 244/119 |
| 2014/0231586 A1* | 8/2014 | Brown | ..................... | B64C 1/18 |
| | | | | 244/119 |
| 2015/0014484 A1* | 1/2015 | Zeon | ........................ | B64C 3/26 |
| | | | | 244/131 |

FOREIGN PATENT DOCUMENTS

| | | |
|---|---|---|
| EP | 2824030 A1 | 1/2015 |
| FR | 3049928 A1 | 10/2017 |

OTHER PUBLICATIONS

"Extended European Search Report Received For Application No. 20202789.2", dated Apr. 9, 2021, 18 Pages.

European Office Action for application No. 20-202-789.2-1004, dated Jun. 12, 2022.

\* cited by examiner

COMPRESSION CHORD FOR A FUSELAGE

TECHNICAL FIELD

The present disclosure relates generally to aircraft fuselages, and more particularly to pressure deck assemblies for aircraft fuselages.

BACKGROUND

The fuselage of some aircraft is constructed with a pressure deck assembly, which is sometimes referred to as a "pressure deck" or a "horizontal pressure deck". The pressure deck assembly forms a dividing structure that divides the height of the fuselage into different compartments, for example to support the floor of a compartment (e.g., a passenger compartment, a cargo compartment, etc.), to separate a pressurized compartment (e.g., a passenger compartment, a cargo compartment, etc.) from an unpressurized compartment (e.g., a wheel well, a luggage compartment, a compartment containing aircraft system components, etc.), etc. The fuselage of some aircraft is also constructed with an internal bulkhead that forms a dividing structure that divides the length of the fuselage into different compartments, for example as a component of a wheel well of the aircraft. The pressure deck assembly and the bulkhead are joined together at a corner joint.

Some aircraft designs generate higher compression loads at the corner joints between bulkheads and pressure deck assemblies. But, existing corner joint designs must be heavy to carry the higher compression loads generated by such aircraft designs. Moreover, assembling existing corner joint designs to thereby join the bulkhead and pressure deck assembly together are time consuming, costly, and/or injure operators performing the assembly.

SUMMARY

In one aspect, a fuselage is provided for an aircraft. The fuselage includes a pressure deck assembly extending along a roll axis of the fuselage. The pressure deck assembly includes longitudinal beams and a pressure deck. The longitudinal beams extend lengths along the roll axis of the fuselage. The pressure deck extends between the longitudinal beams along the lengths of the longitudinal beams. The pressure deck is compliant along a pitch axis of the fuselage. The fuselage includes a bulkhead extending along a yaw axis of the fuselage. The bulkhead is joined to the pressure deck assembly at a corner joint. The fuselage includes a compression chord extending a length along the pitch axis of the fuselage. The compression chord is joined between the pressure deck assembly and the bulkhead at the corner joint such that the compression chord extends on an outside of the corner joint.

In another aspect, a fuselage is provided for an aircraft. The fuselage includes a pressure deck assembly extending along a roll axis of the fuselage. The pressure deck assembly includes longitudinal beams, corner fittings, and a pressure deck. The longitudinal beams extend lengths along the roll axis of the fuselage. The corner fittings are joined to at least one of the longitudinal beams or the pressure deck. The pressure deck extends between the longitudinal beams along the lengths of the longitudinal beams. The pressure deck is compliant along a pitch axis of the fuselage. The fuselage includes a bulkhead extending along a yaw axis of the fuselage. The bulkhead is joined to the pressure deck assembly. The fuselage includes a compression chord extending a length along the pitch axis of the fuselage. The compression chord is joined between the pressure deck assembly and the bulkhead such that a load path of the compression chord has right of way over a load path of the corner fittings.

In another aspect, a method is provided for fabricating a fuselage. The method includes constructing a pressure deck assembly such that longitudinal beams of the pressure deck assembly extend lengths along a roll axis of the fuselage and such that a compliant pressure deck of the pressure deck assembly extends between the longitudinal beams; constructing a bulkhead that extends along a yaw axis of the fuselage; joining the pressure deck assembly and the bulkhead together at a corner joint; and joining a compression chord between the pressure deck assembly and the bulkhead at the corner joint such that the compression chord extends on an outside of the corner joint.

DETAILED DESCRIPTION

Figure 1:
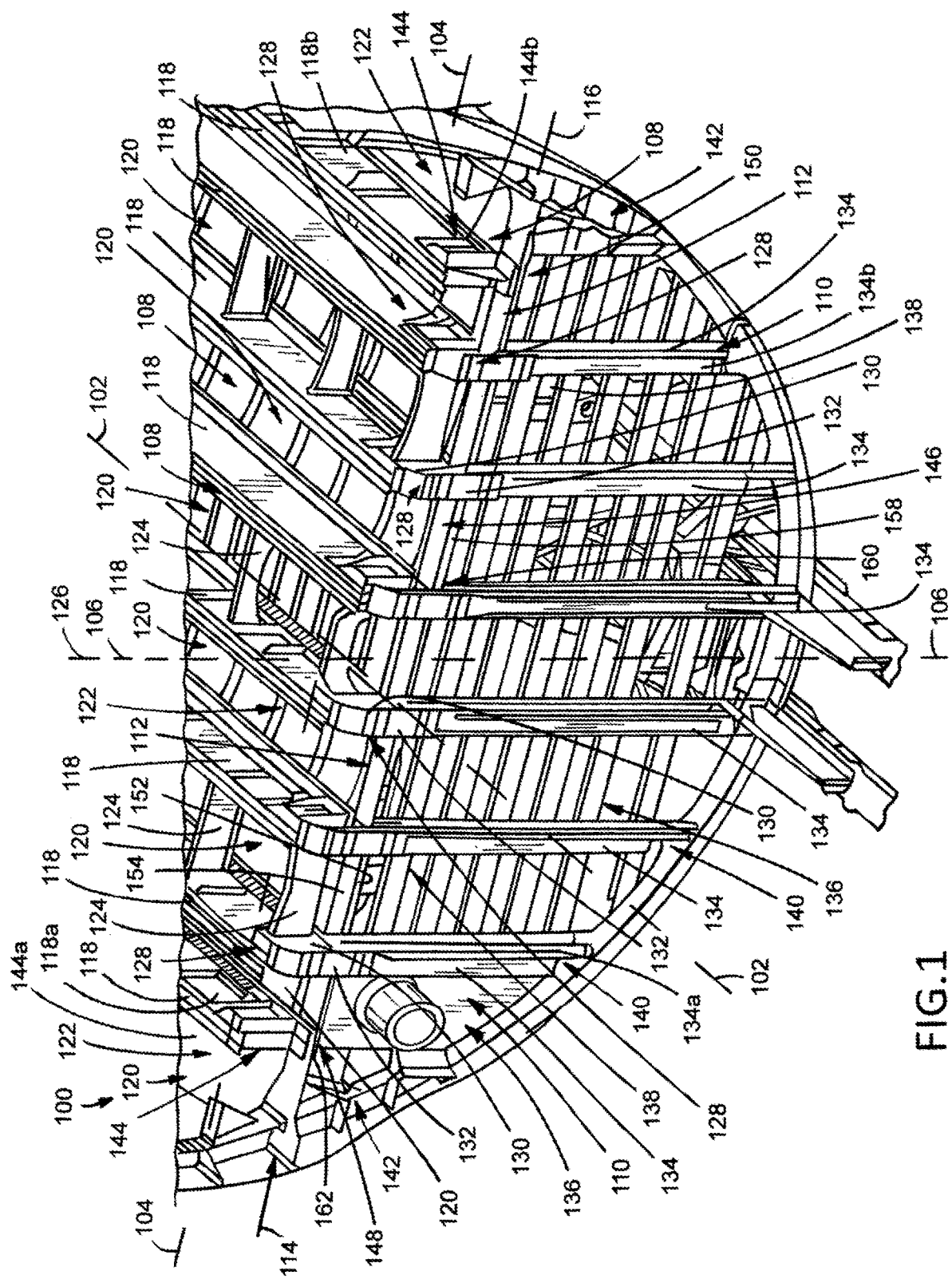
FIG. 1 is a broken-away perspective view illustrating a portion of a fuselage for an aircraft according to an implementation.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations of the present disclosure provide a fuselage for an aircraft. The fuselage includes a pressure deck assembly extending along a roll axis of the fuselage.

The pressure deck assembly includes longitudinal beams and a pressure deck. The longitudinal beams extend lengths along the roll axis of the fuselage. The pressure deck extends between the longitudinal beams along the lengths of the longitudinal beams. The pressure deck is compliant along a pitch axis of the fuselage. The fuselage includes a bulkhead extending along a yaw axis of the fuselage. The bulkhead is joined to the pressure deck assembly at a corner joint. The fuselage includes a compression chord extending a length along the pitch axis of the fuselage. The compression chord is joined between the pressure deck assembly and the bulkhead at the corner joint such that the compression chord extends on an outside of the corner joint.

Certain implementations of the present disclosure provide a fuselage for an aircraft. The fuselage includes a pressure deck assembly extending along a roll axis of the fuselage. The pressure deck assembly includes longitudinal beams, corner fittings, and a pressure deck. The longitudinal beams extend lengths along the roll axis of the fuselage. The corner fittings are joined to at least one of the longitudinal beams or the pressure deck. The pressure deck extends between the longitudinal beams along the lengths of the longitudinal beams. The pressure deck is compliant along a pitch axis of the fuselage. The fuselage includes a bulkhead extending along a yaw axis of the fuselage. The bulkhead is joined to the pressure deck assembly. The fuselage includes a compression chord extending a length along the pitch axis of the fuselage. The compression chord is joined between the pressure deck assembly and the bulkhead such that a load path of the compression chord has right of way over a load path of the corner fittings.

Certain implementations of the present disclosure provide a relatively smooth and/or relatively straight transverse load path through a corner joint between a pressure deck assembly and a bulkhead. Certain implementations of the present disclosure enable the corner joint between a pressure deck assembly and a bulkhead to carry higher compression loads. Certain implementations of the present disclosure increase the transverse stiffness of a corner joint between a pressure deck assembly and a bulkhead.

Certain implementations of the present disclosure reduce or eliminate drilling operations performed during assembly of a corner joint between a bulkhead and a pressure deck assembly. Certain implementations of the present disclosure reduce a part count of a corner joint between a bulkhead and a pressure deck assembly. Certain implementations of the present disclosure reduce the weight of a corner joint between a bulkhead and a pressure deck assembly. Certain implementations of the present disclosure reduce the time required to assemble a corner joint between a bulkhead and a pressure deck assembly. Certain implementations of the present disclosure reduce the cost of assembling a corner joint between a bulkhead and a pressure deck assembly and therefore a fuselage. Certain implementations of the present disclosure reduce the number of injuries that occur while joining a bulkhead and a pressure deck assembly together at a corner joint.

With references now to the figures, a broken-away perspective view of a portion of a fuselage 100 for an aircraft (e.g., aircraft 300 shown in FIG. 7, etc.) is provided in FIG. 1. The fuselage 100 extends a length (i.e., longitudinally) along a roll axis 102 of the fuselage 100 and aircraft. The fuselage 100 extends a width (e.g., laterally, horizontally, etc.) along a pitch axis 104 of the fuselage 100 and the aircraft. The fuselage 100 extends a height (e.g., vertically, etc.) along a yaw axis 106 of the fuselage 100 and the aircraft. As can be seen in FIG. 1, the roll axis 102, the pitch axes 104, and the yaw 106 extend perpendicular relative to each other. During flight of the aircraft, the fuselage 100 is configured to make roll, pitch, and yaw movements about the roll axis 102, the pitch axes 104, and the yaw 106, respectively. In the exemplary implementation, the fuselage 100 is a semi-monocoque fuselage, but the fuselage 100 is any other type of the fuselage 100 in other implementations.

The fuselage 100 includes a pressure deck assembly 108 and a bulkhead 110 that are joined together at a corner joint 112. The corner joint 112 will be described in more detail below. As shown in FIG. 1, the pressure deck assembly 108 extends along the roll axis 102 of the fuselage 100. Specifically, the pressure deck assembly 108 extends a length along the roll axis 102. In other words, a length of the pressure deck assembly 108 extends longitudinally along a length of the fuselage 100. The width of the pressure deck assembly 108 extends laterally across the width of the fuselage 100 along the pitch axis 104.

The pressure deck assembly 108 forms a dividing structure that divides the height of the fuselage 100 into different compartments along at least a portion of the length of the fuselage 100. In some implementations, the pressure deck assembly 108 is a supporting structure that supports (or directly forms) the floor of a cargo compartment and/or a passenger compartment (e.g., an interior compartment 306 shown in FIG. 7, etc.) of the aircraft. The pressure deck assembly 108 separates a pressurized compartment (e.g., the interior compartment 306 shown in FIG. 7, etc.) from one or more unpressurized compartments (e.g., a wheel well, etc.) of the fuselage 100 in some implementations.

In the exemplary implementation, the length of the pressure deck assembly 108 extends approximately parallel to the roll axis 102 of the fuselage 100 and a width of the pressure deck assembly 108 extends approximately parallel to the pitch axis 104 such that the pressure deck assembly 108 extends approximately horizontal when the fuselage 100 is oriented upright (e.g., level with the horizon, etc.). In other implementations, at least a segment of the length of the pressure deck assembly 108 extends at a non-parallel angle (e.g., an acute angle, an obtuse angle, etc.) relative to the roll axis 102 of the fuselage 100 and/or at least a segment of the width of the pressure deck assembly 108 extends at non-parallel angle (e.g., an acute angle, an obtuse angle, etc.) relative to the pitch axis 104 of the fuselage 100.

As shown in FIG. 1, the bulkhead 110 extends along the yaw axis 106 of the fuselage 100. Specifically, the bulkhead 110 extends a length along the yaw axis 106. In other words, a length of the bulkhead 110 extends vertically along a height of the fuselage 100. A width of the bulkhead 110 extends laterally across a width of the fuselage 100 along the pitch axis 104. The bulkhead 110 forms a dividing structure that divides the length of the fuselage 100 into different compartments along at least a portion of the height of the fuselage 100. In some implementations, the bulkhead 110 is a component of (e.g., forms a support structure of, forms a boundary of, extends within, etc.) a wheel well (e.g., a wheel well 320 shown in FIG. 7, etc.) of the fuselage 100.

In the exemplary implementation, the length and the width of the bulkhead 110 extend approximately parallel to the yaw axis 106 and the pitch axis 104, respectively, of the fuselage 100 such that the bulkhead 110 extends approximately vertical when the fuselage 100 is oriented upright (e.g., level with the horizon, etc.). However, in other implementations, at least a segment of the length of the bulkhead 110 extends at a non-parallel angle (e.g., an acute angle, an obtuse angle, etc.) relative to the yaw axis 106 of the fuselage 100 and/or at least a segment of the width of the bulkhead 110 extends at non-parallel angle (e.g., an acute angle, an obtuse angle, etc.) relative to the pitch axis 104 of the fuselage 100.

Figure 7:
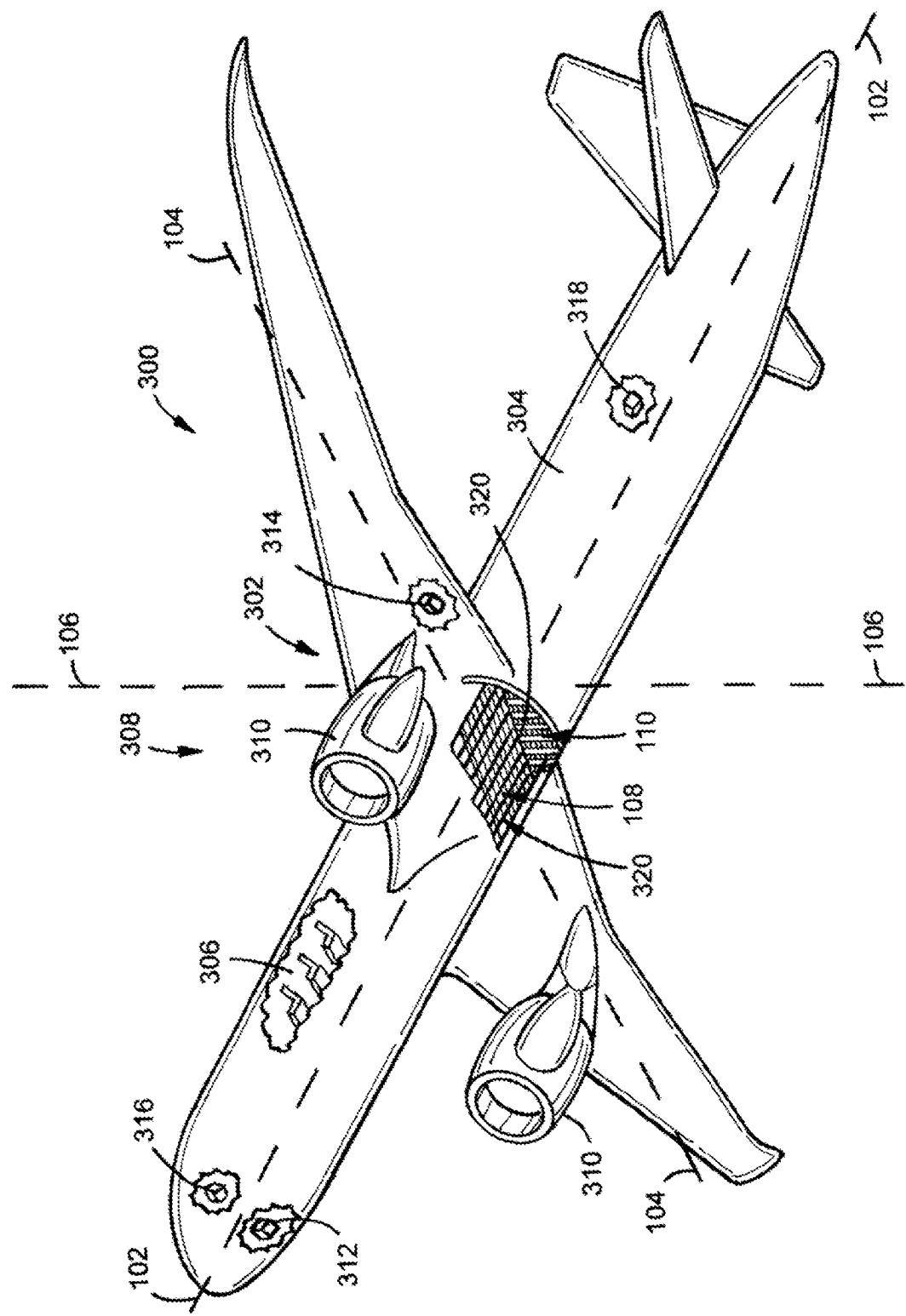
FIG. 7 is a schematic view of an implementation of an aircraft.

The pressure deck assembly 108 and the bulkhead 110 are joined together at any location along the length of the fuselage 100 (i.e., an any location along a length of the roll axis 102). In other words, the bulkhead 110 is located at any location along the length of the fuselage 100. FIG. 7 illustrates an example of the location of the bulkhead 110 according to an exemplary implementation. Specifically, the bulkhead 110 is a component of the wheel well 320 of a fuselage 304 (e.g., the bulkhead 110 forms a support structure of the wheel well 320, the bulkhead 110 forms a boundary of the wheel well 320, the bulkhead extends within the wheel well 320, etc.). Accordingly, the bulkhead 110 and the pressure deck assembly 108 are joined together at the wheel well 320 in the exemplary implementation of FIG. 7. But, the bulkhead 110 has any other location along the length of the fuselage 304, whether such location is within a wheel well of the fuselage 304. For example, in other implementations, the bulkhead 110 forms a support structure of another component, structure, and/or the like of the fuselage 304 in addition or alternatively to a wheel well. Only a segment of the length of the pressure deck assembly 108 is shown in FIG. 7 for clarity.

Figure 2:
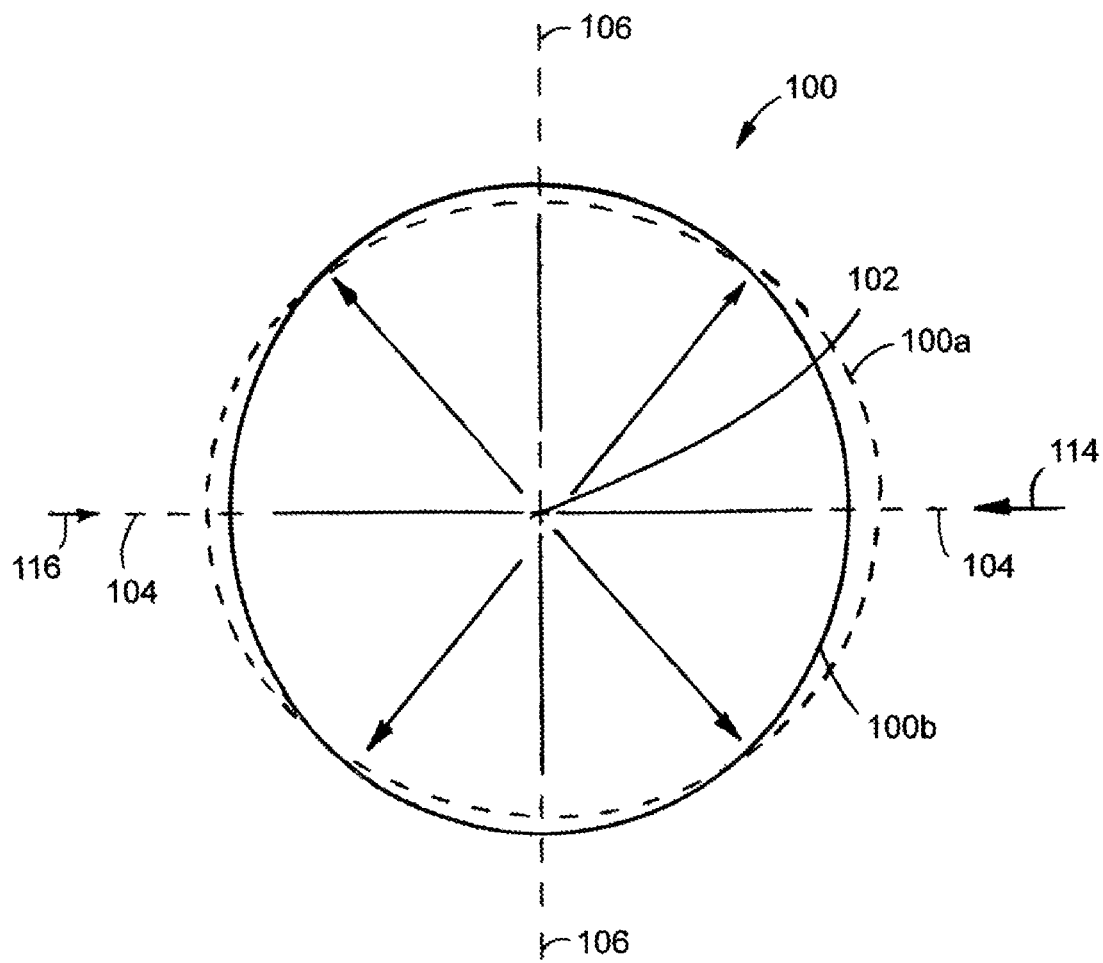
FIG. 2 is a cross-sectional view of the fuselage shown in FIG. 1 according to an implementation.

Referring now to FIG. 2, the exemplary implementation of the fuselage 100 includes a wider-than-tall elliptical cross-sectional shape at least at the location of the bulkhead 110 (at least when the interior of the fuselage 100 is unpressurized). Specifically, the cross-sectional shape of the fuselage 100 at the bulkhead 110 when an interior of the fuselage 100 is not pressurized is indicated in FIG. 2 with a dotted line, which is labeled with a reference numeral 100a. In other words, the dotted line 100a illustrates an unpressurized cross-sectional shape of the exemplary implementation of the fuselage 100 at the location of the bulkhead 110. The cross-sectional shape of exemplary implementation of the fuselage 100 at the bulkhead 110 when the interior of the fuselage 100 is pressurized is shown in FIG. 2 with a solid line 100b. In other words, the solid line 100b illustrates a pressurized cross-sectional shape of the exemplary implementation of the fuselage 100 at the location of the bulkhead 110.

As can be seen in FIG. 2, the unpressurized cross-sectional shape represented by the dotted line 100a of the fuselage 100 is a wider-than-tall ellipse. Specifically, the unpressurized cross-sectional shape represented by the dotted line 100a of the fuselage 100 is an elliptical cross-sectional shape that is larger along the pitch axis 104 than along the yaw axis 106. As can be seen from a comparison of the dotted line 100a and the solid line 100b, the pressurized cross-sectional shape represented by the solid line 100b of the fuselage 100 is smaller along the pitch axis 104 and larger along the yaw axis 106 as compared to the unpressurized cross-sectional shape represented by the dotted line 100a of the fuselage 100. Accordingly, pressurization of the interior of the fuselage 100 exerts (e.g., increases, etc.) compression forces on the fuselage 100 in directions of arrows 114 and 116 that shrink the fuselage 100 along the pitch axis 104 and enlarge the fuselage 100 along the yaw axis 106.

The fuselage 100 is not limited to including a wider-than-tall elliptical cross-sectional shape at the location of the bulkhead 110. Rather, in other implementations, the fuselage 100 includes an approximately circular cross-sectional shape at the location of the bulkhead 110 when the fuselage 100 is unpressurized. In still other implementations, the fuselage 100 includes a taller-than-wide elliptical cross-sectional shape at the location of the bulkhead 110 when the fuselage 100 is unpressurized.

Figure 3:
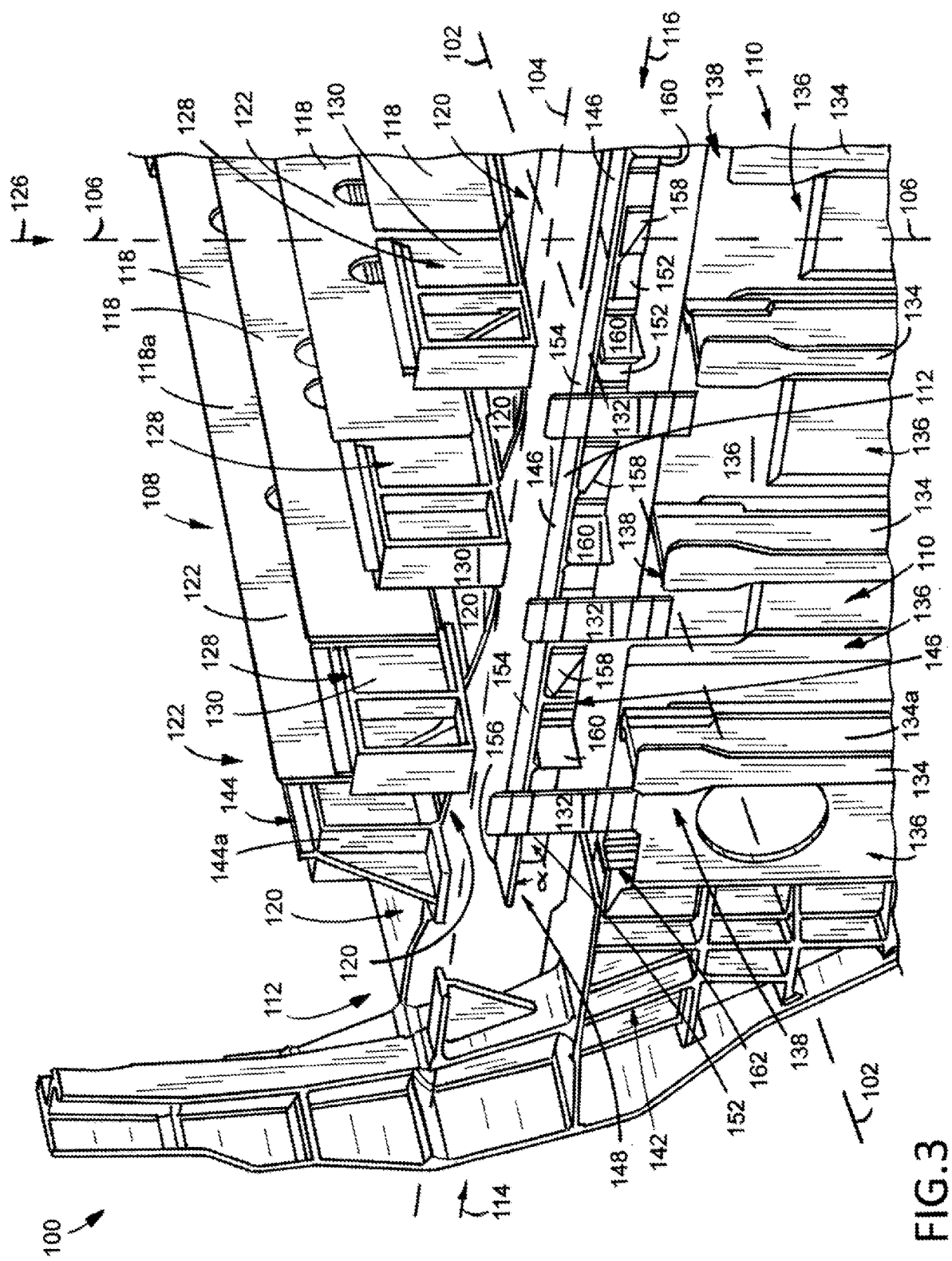
FIG. 3 is an exploded perspective view of a portion of the fuselage shown in FIG. 1.

Referring now to FIGS. 1 and 3, the pressure deck assembly 108 includes a plurality of longitudinal beams 118 and a pressure deck 120. Each of the plurality of longitudinal beams 118 extend a length along the roll axis 102 of the fuselage 100 from an end portion 122 to an opposite end portion (not shown). In other words, lengths of each of the plurality of longitudinal beams 118 extends longitudinally along the length of the fuselage 100. In the exemplary implementation, the length of each of the plurality of longitudinal beam 118 extends approximately parallel to the roll axis 102 of the fuselage 100 and approximately perpendicular to each of the pitch axis 104 and the yaw axis 106. However, in other implementations, the length of one or more of the plurality of longitudinal beams 118 extends: (1) at a non-parallel angle (e.g., an acute angle, an obtuse angle, etc.) relative to the roll axis 102 of the fuselage 100; (2) at a non-perpendicular angle relative to the pitch axis 104; and/or (3) at a non-perpendicular angle relative to the yaw axis 106.

Optionally, the pressure deck assembly 108 includes one or more intercostals 124 (not shown in FIG. 3) that are joined between adjacent longitudinal beams of the plurality of longitudinal beams 118, for example to facilitate supporting the adjacent longitudinal beams of the plurality of longitudinal beams 118 in the orientation shown herein. Each of the plurality of longitudinal beams 118 includes (e.g., is fabricated from, consists of, etc.) any material(s) that enables each of the plurality of longitudinal beams 118 to function as described and/or illustrated herein, such as, but not limited to, titanium, aluminum, steel, an alloy of two or more metals, a composite material, and/or the like. Although eight are shown in the exemplary implementation, the pressure deck assembly 108 includes any number of the plurality of longitudinal beams 118.

The pressure deck 120 extends between the plurality of longitudinal beams 118 along the lengths of the plurality of longitudinal beams 118. Specifically, along the lengths of the plurality of longitudinal beams 118, the pressure deck 120 extends laterally along the pitch axis 104 between each pair of adjacent longitudinal beams of the plurality of longitudinal beams 118, as is illustrated in FIGS. 1 and 3. In some implementations, the pressure deck 120 is a continuous deck that spans continuously across the plurality of longitudinal beams 118 along the width of the fuselage 100. As used herein, the term "spans continuously across the plurality of longitudinal beams 118" is intended to mean that the pressure deck 120 extends along the width of the fuselage 100 from an outermost longitudinal beam 118a to an outermost longitudinal beam 118b (not visible in FIG. 3) while overlapping all of the plurality of longitudinal beams 118 that extend between the outermost longitudinal beams 118a and 118b. In other implementations, the pressure deck 120 is separated into two or more discrete (e.g., separate, individual, etc.) segments that each extend between one or more pairs of adjacent longitudinal beams of the plurality of longitudinal beams 118. For example, in some implementations the pressure deck 120 is separated into a plurality of discrete segments that each extends between only a single corresponding pair of adjacent longitudinal beams of the plurality of longitudinal beams 118.

The pressure deck 120 is a compliant pressure deck. In other words, the pressure deck 120 is a deflectable spring. Specifically, the pressure deck 120 is resiliently deflectable along the pitch axis 104 of the fuselage 100. Accordingly, the pressure deck 120 is compliant along the pitch axis 104 of the fuselage 100. The compliance of the pressure deck 120 along the pitch axis 104 increases compression forces exerted (e.g., in the directions of the arrows 114 and 116, etc.) on the corner joint 112 between the pressure deck assembly 108 and the bulkhead 110. The increased compression forces exerted on the corner joint 112 are exacerbated (e.g., further increased, etc.) in implementations wherein the unpressurized cross-sectional shape (e.g., the cross-sectional shape represented by the dotted line 100a shown in FIG. 2, etc.) of the fuselage 100 includes a wider-than-tall ellipse at the location of the bulkhead 110.

The pressure deck 120 includes (e.g., is fabricated from, consists of, etc.) any material(s) that enable the pressure deck 120 to be compliant along the pitch axis 104 of the fuselage 100, such as, but not limited to, titanium, aluminum, steel, an alloy of two or more metals, a composite material, and/or the like. In the exemplary implementation, the pressure deck 120 is a catenary shaped web. However, the pressure deck 120 additionally or alternatively includes any type of compliant structure, such as, but not limited to, a parabolic shape, a sinusoidal shape, a radius shape, and/or the like.

Figure 5:
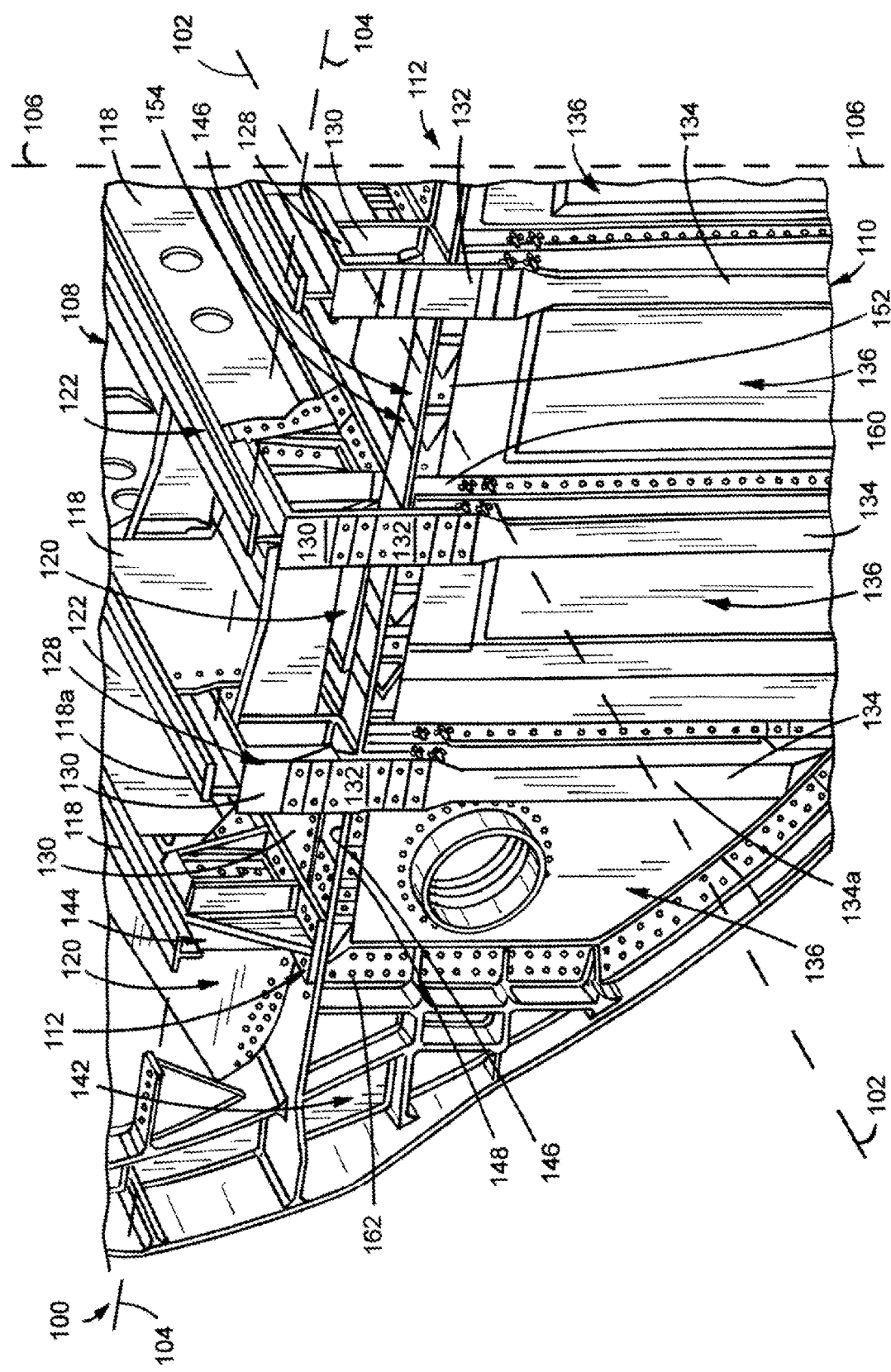
FIG. 5 is an enlarged perspective view of a portion of the fuselage shown in FIG. 1.

The pressure deck assembly 108 includes a plurality of corner fittings 128 that are joined to the longitudinal beams 118 and/or the pressure deck 120, for example using bolts, rivets, adhesive, epoxy, welding, brazing, and/or the like. Specifically, the exemplary implementation of each of the plurality of corner fittings 128 includes a block 130 and a strap 132 that is discrete (e.g., separate, individual, etc.) from the block 130. Accordingly, each of the plurality of corner fittings 128 is a two-piece structure in the exemplary implementation. The block 130 of each of the plurality of corner fittings 128 is joined to the pressure deck 120 adjacent the end portion 122 of a corresponding one of the plurality of longitudinal beams 118 and/or is joined to the end portion 122 of the corresponding one of the plurality of longitudinal beams 118. In the exemplary implementation, the block 130 of each of the plurality of corner fittings 128 is joined to the both the pressure deck 120 and to the end portion 122 of each corresponding ones of the plurality of longitudinal beams 118, as is best seen in FIG. 5. As will be described below, the straps 132 of the plurality of corner fittings 128 join the blocks 130 of the plurality of corner fittings 128 to corresponding bulkhead beams 134 of the bulkhead 110.

Each of the blocks 130 of the plurality of corner fittings 128 includes (e.g., is fabricated from, consists of, etc.) any material(s) that enable the plurality of corner fittings 128 to function as described and/or illustrated herein, such as, but not limited to, titanium, aluminum, steel, an alloy of two or more metals, a composite material, and/or the like. Each of the straps 132 of the plurality of corner fittings 128 includes (e.g., is fabricated from, consists of, etc.) any material(s) that enable the plurality of corner fittings 128 to function as described and/or illustrated herein, such as, but not limited to, titanium, aluminum, steel, an alloy of two or more metals, a composite material, and/or the like.

The bulkhead 110 includes a plurality of the bulkhead beams 134 and a web 136. Each of the bulkhead beams 134 extends a length along the yaw axis 106 of the fuselage 100 from an end portion 138 to an opposite end portion 140 (not visible in FIG. 3). In other words, the lengths of the bulkhead beams 134 extend vertically along the height of the fuselage 100. In the exemplary implementation, the length of each of the bulkhead beams 134 extends approximately parallel to the yaw axis 106 of the fuselage 100 and approximately perpendicular to each of the roll axis 102 and the pitch axis 104. However, in other implementations, the length of one or more of the bulkhead beams 134 extends: (1) at a non-parallel angle (e.g., an acute angle, an obtuse angle, etc.) relative to the yaw axis 106 of the fuselage 100; (2) at a non-perpendicular angle relative to the roll axis 102; and/or (3) at a non-perpendicular angle relative to the pitch axis 104.

Optionally, the bulkhead 110 includes one or more intercostals (not shown) that are joined between adjacent bulkhead beams of the bulkhead beams 134, for example to facilitate supporting the bulkhead beams 134 in the orientation shown herein. Each of the bulkhead beams 134 includes (e.g., is fabricated from, consists of, etc.) any material(s) that enables each of the bulkhead beams 134 to function as described and/or illustrated herein, such as, but not limited to, titanium, aluminum, steel, an alloy of two or more metals, a composite material, and/or the like. Although six are shown in the exemplary implementation, the bulkhead 110 includes any number of the bulkhead beams 134.

The web 136 extends between the bulkhead beams 134 along the lengths of the bulkhead beams 134. Specifically, along the lengths of the bulkhead beams 134, the web 136 extends laterally along the pitch axis 104 of the fuselage 100 between each pair of adjacent bulkhead beams of the bulkhead beams 134, as is illustrated in FIGS. 1 and 3. In some implementations, the web 136 is a continuous web that spans continuously across the bulkhead beams 134 along the width of the fuselage 100. As used herein, the term "spans continuously across the bulkhead beams 134" is intended to mean that the web 136 extends along the width of the fuselage 100 from an outermost bulkhead beam 134a to an outermost bulkhead beam 134b (not visible in FIG. 3) while overlapping all of the bulkhead beams 134 that extend between the outermost bulkhead beams 134a and 134b. In other implementations, the web 136 is separated into two or more discrete (e.g., separate, individual, etc.) segments that each extend between one or more pairs of adjacent bulkhead beams of the bulkhead beams 134. For example, in some implementations the web 134 is separated into a plurality of discrete segments that each extends between only a single corresponding pair of adjacent bulkhead beams of the bulkhead beams 134.

The web 136 includes (e.g., is fabricated from, consists of, etc.) any material(s) that enable the web 136 to function as described and/or illustrated herein, such as, but not limited to, titanium, aluminum, steel, an alloy of two or more metals, a composite material, and/or the like. In the exemplary implementation, the web 136 is a flat web. But, the web 136 additionally or alternatively includes any type of web, such as, but not limited to, a compliant web, a catenary shaped web, a parabolic shaped web, a sinusoidal shaped web, a radius shaped web, and/or the like.

The bulkhead 110 includes two or more side fittings 142 (only one is visible in FIG. 3) that are joined to the web 136, for example using bolts, rivets, adhesive, epoxy, welding, brazing, and/or the like. Optionally, the side fittings 142 are joined to the pressure deck 120 of the pressured deck assembly 108 (e.g., using bolts, rivets, adhesive, epoxy, welding, brazing, etc.), as is best seen in FIG. 5. Moreover, the side fittings 142 are optionally joined (e.g., using bolts, rivets, adhesive, epoxy, welding, brazing, etc.) to corner fittings 144 (only one is visible in FIG. 3) of (and/or are joined directly to) corresponding one of the outermost longitudinal beams 118a and 118b of the pressure deck assembly 108, as is also shown in FIG. 5. Each of the side fittings 142 includes (e.g., is fabricated from, consists of, etc.) any material(s) that enable each of the side fittings 142 to function as described and/or illustrated herein, such as, but not limited to, titanium, aluminum, steel, an alloy of two or more metals, a composite material, and/or the like.

The corner joint 112 between the pressure deck assembly 108 and the bulkhead 110 includes a compression chord 146. The compression chord 146 extends along the pitch axis 104. Specifically, the compression chord 146 extends a length along the pitch axis 104 of the fuselage 100 from an end portion 148 to an opposite end portion 150 (not visible in FIG. 3). In other words, the length of the compression chord 146 extends laterally across width of the fuselage 100. In the exemplary implementation, the length of the compression chord 146 extends approximately parallel to the pitch axis 104 of the fuselage 100 and approximately perpendicular to each of the axes 102 and 106. But, in other implementations, a length of the compression chord 146 extends: (1) at a non-parallel angle (e.g., an acute angle, an obtuse angle, etc.) relative to the pitch axis 104 of the fuselage 100; (2) at a non-perpendicular angle relative to the roll axis 102; and/or (3) at a non-perpendicular angle relative to the yaw axis 106. In some examples, each of the end portions 148 and 150 are referred to herein as a "first" and/or a "second" end portion.

In the exemplary implementation, the length of the compression chord 146 is a continuous structure that extends from the end portion 148 to the end portion 150. In other words, the length of the compression chord 146 is integrally formed as a single, unitary structure from the end portion 148 to the end portion 150. Accordingly, and as will be described below, the length of the compression chord 146 spans continuously across at least three corner fittings (e.g., the corner fittings 128 and/or 144, etc.) of the pressure deck assembly 108 along the width of the fuselage 100. As used herein, the term "spans continuously across at least three corner fittings" is intended to mean that the length of the compression chord 146 extends along the width of the fuselage 100 from a first corner fitting to a third corner fitting while overlapping a second corner fitting that extends between the first and third corner fittings. For example, in the exemplary implementation, the length of the compression chord 146 spans continuously across all of the corner fittings 128 and 144. Specifically, as best seen in FIG. 1, the end portion 148 of the compression chord 146 extends along the width of the fuselage 100 from the corner fitting 144a of the outermost longitudinal beam 118a to the corner fitting 144b (not visible in FIG. 3) of the outermost longitudinal beam 118b, while the length of the compression chord 146 extending between the end portions 148 and 150 overlaps all of the plurality of corner fittings 128 (which extend between the corner fittings 144a and 144b along the pitch axis 104).

Figure 4:
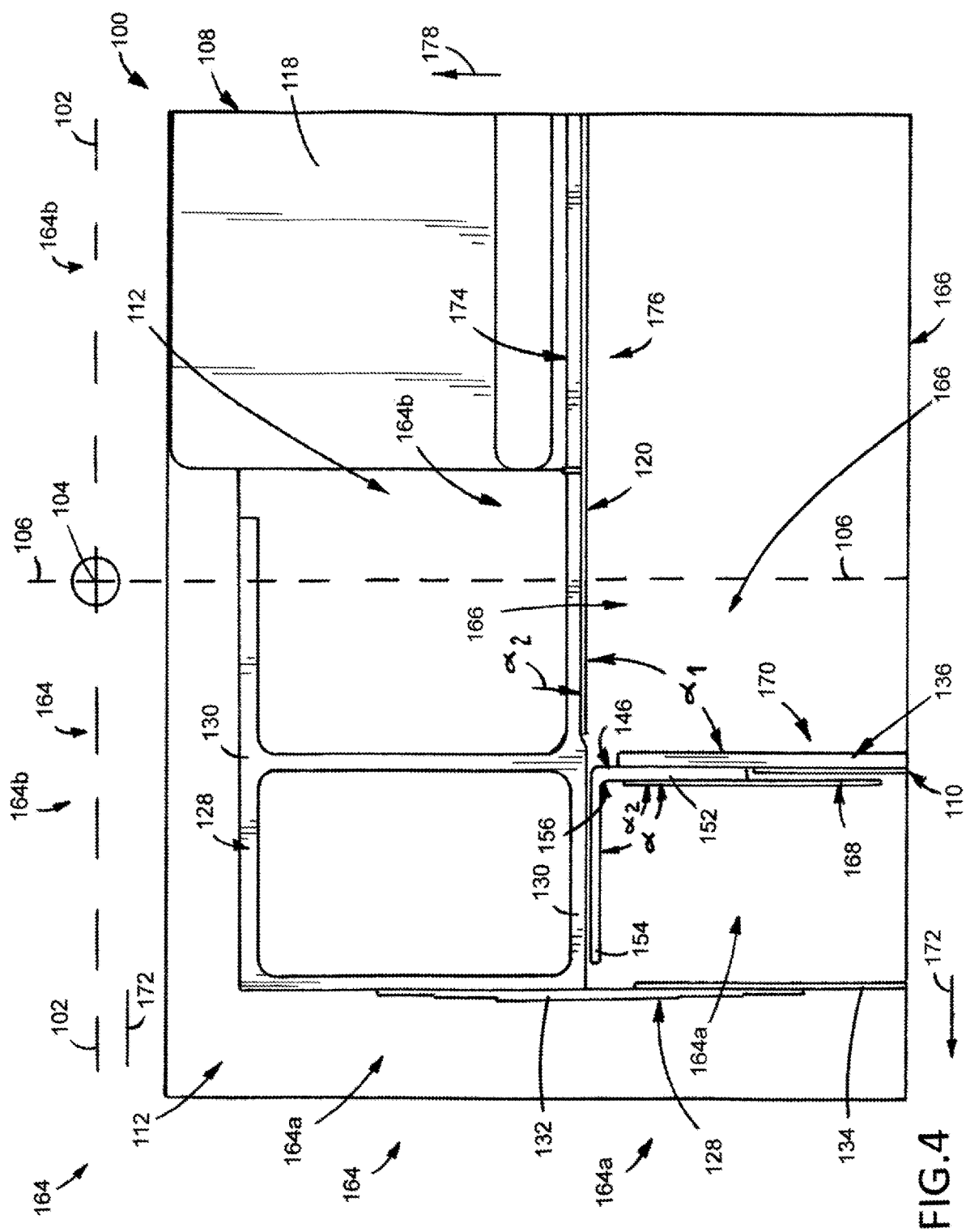
FIG. 4 is a cross-sectional view illustrating a corner joint between a pressure deck assembly and a bulkhead of the fuselage shown in FIGS. 1-3 according to an implementation.

Referring now to FIGS. 1, 3 and 4, the exemplary implementation of the compression chord 146 includes an L-shape defined by leg segments 152 and 154 that extend at a non-parallel angle α (not labeled in FIG. 1) relative to each other. In the exemplary implementation, the angle α between the leg segments 152 and 154 is approximately 90° such that the leg segments 152 and 154 extend approximately perpendicular to each other. However, in other implementations the angle α between the leg segments 152 and 154 is neither a perpendicular nor parallel angle (e.g., the angle α is acute angle, the angle α an obtuse angle, etc.). In some examples, each of the leg segments 152 and/or 154 are referred to herein as a "first" and/or a "second" leg segment.

FIGS. 1, 3, and 4 illustrate that the leg segment 152 extends outwardly from the leg segment 154 along the yaw axis 106 of the fuselage 100, while the leg segment 154 extends outwardly from the leg segment 152 along the roll axis 102. Specifically, the leg segment 152 extends a length outwardly from an intersection 156 (not labeled in FIG. 1) of the leg segments 152 and 154 along the yaw axis 106, and the leg segment 154 extends a length outwardly from the intersection 156 along the roll axis 102. In the exemplary implementation, the compression chord 146 is oriented within the corner joint 112 such that: (1) the length of the leg segment 152 extends approximately parallel to the yaw axis 106; and (2) the length of the leg segment 154 extends approximately parallel to the roll axis 102. However, in other implementations: (1) the length of the leg segment 152 extends outwardly from the intersection 156 at a non-parallel angle (e.g., an acute angle, an obtuse angle, etc.) relative to the yaw axis 106 of the fuselage 100; and/or (2) the length of the leg segment 154 extends outwardly at a non-parallel angle (e.g., an acute angle, an obtuse angle, etc.) relative to the roll axis 102. The length that each leg segments 152 and 154 extends outwardly from the intersection 156 has any dimension. In some implementations, the dimension of the length of the leg segment 152 is different than the dimension of the length of the leg segment 154.

In some embodiments, the compression chord 146 includes one or more support members 158 (not shown in FIG. 4) that support the leg segments 152 and 154 relative to each other. Moreover, the compression chord 146 optionally includes one or more mounts 160 (not shown in FIG. 4) for joining the compression chord 146 to the bulkhead beams 134 of the bulkhead 110. The compression chord 146 includes (e.g., is fabricated from, consists of, etc.) any material(s) that enable the compression chord to function as described and/or illustrated herein, such as, but not limited to, titanium, aluminum, steel, an alloy of two or more metals, a composite material, and/or the like. In some other implementations, the compression chord 146 does not include the leg segment 154 such that the compression chord 146 only includes the leg segment 152.

Referring now to FIGS. 4 and 5, the corner joint 112 between the bulkhead 110 and the pressure deck assembly 108 is assembled at least in part by joining the compression chord 146 between the pressure deck assembly 108 and the bulkhead 110. For example, the leg segment 152 of the compression chord 146 is joined to web 136 of the bulkhead 110, for example using bolts, rivets, adhesive, epoxy, welding, brazing, and/or the like. As is best seen in FIG. 4, the leg segment 154 of the compression chord 146 is joined to the blocks 130 of the corner fittings 128, for example using bolts, rivets, adhesive, epoxy, welding, brazing, and/or the like. As briefly described above, the blocks 130 of the plurality of corner fittings 128 are joined to the corresponding bulkhead beams 134 of the bulkhead 110 via (e.g., using, etc.) the straps 132 of the plurality of corner fittings 128, for example using bolts, rivets, adhesive, epoxy, welding, brazing, and/or the like.

Referring now to FIGS. 3 and 5, in some examples, the leg segment 154 of the compression chord 146 is also joined to the corner fittings 144 of the outermost longitudinal beams 118a and 118b at the end portions 148 and 150, respectively, of the compression chord 146, using, for example, bolts, rivets, adhesive, epoxy, welding, brazing, and/or the like. The longitudinal beam 118b and the end portion 150 are not visible in FIGS. 3 and 5 but can be seen in FIG. 1. The end portions 148 and 150 of the compression chord 146 are joined to the side fittings 142 of the bulkhead 110 via (e.g., using, etc.) corresponding splices 162, for example using bolts, rivets, adhesive, epoxy, welding, brazing, and/or the like. Each of the splices 162 includes (e.g., is fabricated from, consists of, etc.) any material(s) that enable each of the splices 162 to function as described and/or illustrated herein, such as, but not limited to, titanium, aluminum, steel, an alloy of two or more metals, a composite material, and/or the like. Optionally, the compression chord 146 is joined to the bulkhead beams 134 of the bulkhead 110 at the mounts 160 of the compression chord 146, for example using bolts, rivets, adhesive, epoxy, welding, brazing, and/or the like. Moreover, the compression chord 146 is optionally joined to the pressure deck 120 along the pitch axis 104 between adjacent corner fittings 128 and/or 144, whether directly and/or via an intervening structure (not shown).

Referring now to FIG. 4, the compression chord 146 is joined between the pressure deck assembly 108 and the bulkhead 110 at the corner joint 112 such that the compression chord 146 extends on an outside 164 of the corner joint 112. Specifically, the corner joint 112 includes an inside 166 that is defined by a first volume of space that extends within the angle $\alpha_1$ of the corner joint 112 formed between the pressure deck assembly 108 and the bulkhead 110. The outside 164 of the corner joint 112 is defined by a second volume of space that extends within the angle $\alpha_2$ of the corner joint 112 formed between the pressure deck assembly 108 and the bulkhead 110. The web 136 of the bulkhead 110 includes an exterior side 168 and an interior side 170 that extends opposite the exterior side 168. As can be seen in FIG. 4, the exterior side 168 of the web 136 defines a portion of the outside 164 of the corner joint 112. For example, the exterior side 168 of the web 136 faces in a direction 172 along the roll axis 102 of the fuselage 100 that extends away from the inside 166 of the corner joint 112. Moreover, and for example, the direction 172 in which the exterior side 168 of the web 136 faces extends away from the pressure deck 120 along the roll axis 102. Accordingly, the exterior side 168 of the web 136 defines a portion 164a of the outside 164 of the corner joint 112 that extends along the yaw axis 106 of the fuselage 100.

The pressure deck 120 of the pressure deck assembly 108 includes an exterior side 174 and an interior side 176 that extends opposite the exterior side 174. The exterior side 174 of the pressure deck 120 defines a portion of the outside 164 of the corner joint 112. For example, the exterior side 174 of the pressure deck 120 faces in a direction 178 along the yaw axis 106 of the fuselage 100 that extends away from the inside 166 of the corner joint 112. Moreover, and for example, the direction 178 in which the exterior side 174 of the pressure deck 120 faces extends away from the web 136 along the yaw axis 106. Accordingly, the exterior side 174 of the pressure deck 120 defines a portion 164b of the outside 164 of the corner joint 112 that extends along the roll axis 102 of the fuselage 100.

As shown in FIG. 4, the compression chord 146 extends on the exterior side 168 of the web 136. Accordingly, the compression chord 146 extends on the outside 164 of the corner joint 112, and more specifically on the portion 164a of the outside 164 of the corner joint 112. In the exemplary implementation, the compression chord 146 is joined to the exterior side 168 of the web 136.

In the exemplary implementation, the direction 172 in which the exterior side 168 faces extends aft along the roll axis 102 of the fuselage 100. In other words, the portion 164a of the outside 164 of the corner joint 112 and the exterior side 168 of the web 136 face aft along the roll axis 102. Accordingly, the exemplary implementation of the compression chord 146 faces aft along the roll axis 102. However, in other implementations the bulkhead 110 and pressure deck assembly 108 are arranged (e.g., oriented relative to the fuselage 100, etc.) such that the portion 164a of the outside 164 of the corner joint 112 faces forward along the roll axis 102 and therefore the compression chord 146 faces forward along the roll axis 102 when the compression chord 146 extends on the outside 164 of the corner joint 112.

Joining the compression chord 146 within the corner joint 112 such that the compression chord 146 extends on the outside 164 of the corner joint 112 enables the compression chord 146 to provide a relatively smooth and/or relatively straight transverse (e.g., across the width of the fuselage 100 along the pitch axis 104, etc.) load path through the corner joint 112. For example, the compression chord 146 reduces or eliminate offsets, eccentricities, and/or the like within a transverse load path through the corner joint 112.

Joining the compression chord 146 within the corner joint 112 such that the compression chord 146 extends on the outside 164 of the corner joint 112 enables the compression chord 146 to carry (e.g., withstand without failing, withstand without fatiguing, etc.) higher compression loads (e.g., compression loads in the directions of the arrows 114 and 116 shown in FIGS. 1 and 3, etc.). Thus, the compression chord 146 enables the corner joint 112 to carry higher compression loads. In other words, the compression chord 146 increases the transverse (e.g., across the width of the fuselage 100 along the pitch axis 104, etc.) stiffness of the corner joint 112.

Referring now to FIGS. 1, 3, and 5, the compression chord 146 is joined between the pressure deck assembly 108 and the bulkhead 110 such that a load path of the compression chord has right of way over a load path of the corner fittings 128 and 144. Specifically, as described above, the length of the compression chord 146 spans continuously across all of the corner fittings 128 and 144. As such, the load path of the compression chord 146 is not broken up along the length of the compression chord 146 at the corner fittings 128 and 144, but rather is continuous along the pitch axis 104 between the corner fittings 144a and 144b. In other words, the compression chord 146 provides a continuous transverse (e.g., across the width of the fuselage 100 along the pitch axis 104, etc.) load path across the corner fittings 128 and 144. Accordingly, the load path of the compression chord 146 has right of way over the corner fittings 128 and 144.

Giving the compression chord 146 right of way over the corner fittings 128 and 144 enables the compression chord 146 to provide a relatively smooth and/or relatively straight transverse (e.g., across the width of the fuselage 100 along the pitch axis 104, etc.) load path through the corner joint 112. For example, the compression chord 146 reduces or eliminate offsets, eccentricities, and/or the like within a transverse load path through the corner joint 112.

Giving the compression chord 146 right of way over the corner fittings 128 and 144 enables the compression chord 146 to carry (e.g., withstand without failing, withstand without fatiguing, etc.) higher compression loads (e.g., compression loads in the directions of the arrows 114 and 116 shown in FIGS. 1 and 3, etc.). Thus, the compression chord 146 enables the corner joint 112 to carry higher compression loads. In other words, the compression chord 146 increases the transverse (e.g., across the width of the fuselage 100 along the pitch axis 104, etc.) stiffness of the corner joint 112.

Giving the compression chord 146 right of way over the corner fittings 128 and 144 reduces the part count of the corner joint 112 and thereby: (1) reduces the weight of the corner joint 112; (2) reduces the time required to assemble the corner joint 112 (e.g., by improving the assembly flow of the fuselage 100, etc.); and/or (3) reduces the cost of assembling the corner joint 112 and thereby the fuselage 100.

In some implementations, the corner fittings 128 and/or 144 are pre-installed (e.g., joined, etc.) to the longitudinal beams 118 prior to assembly of the corner joint 112, as opposed to being installed at the time of assembly of the corner joint 112. Pre-installing the corner fittings 128 and/or 144 to the longitudinal beams 118 reduces the time required to assemble the corner joint 112 (e.g., by improving the assembly flow of the fuselage 100, etc.) and thereby reduces the cost of assembling the corner joint 112 and thus the fuselage 100. Moreover, pre-installing the corner fittings 128 and/or 144 to the longitudinal beams 118 reduces the number of injuries that occur while assembling the corner joint 112, for example by reducing the number of drilling and/or other operations required to complete assembly of the corner joint 112.

In some implementations, one or more components of the pressure deck assembly 108, the bulkhead 110, the corner joint 112, and/or the fuselage 100 (e.g., the compression chord 146, the plurality of longitudinal beams 118, the pressure deck 120, the web 136, the bulkhead beams 134, the splices 162, the corner fittings 144, the plurality of corner fittings 128, the blocks 130, the straps 132, the side fittings 142, etc.) is pre-drilled prior to assembly of the corner joint 112, as opposed to being drilled at the time of assembly of the corner joint 112. Pre-drilling one or more components reduces the time required to assemble the corner joint 112 (e.g., by improving the assembly flow of the fuselage 100, etc.) and thereby reduces the cost of assembling the corner joint 112 and thus the fuselage 100. Moreover, pre-drilling one or more components reduces the number of injuries that occur while assembling the corner joint 112, for example by reducing the number of, or eliminating, drilling operations required to complete assembly of the corner joint 112.

Figure 6:
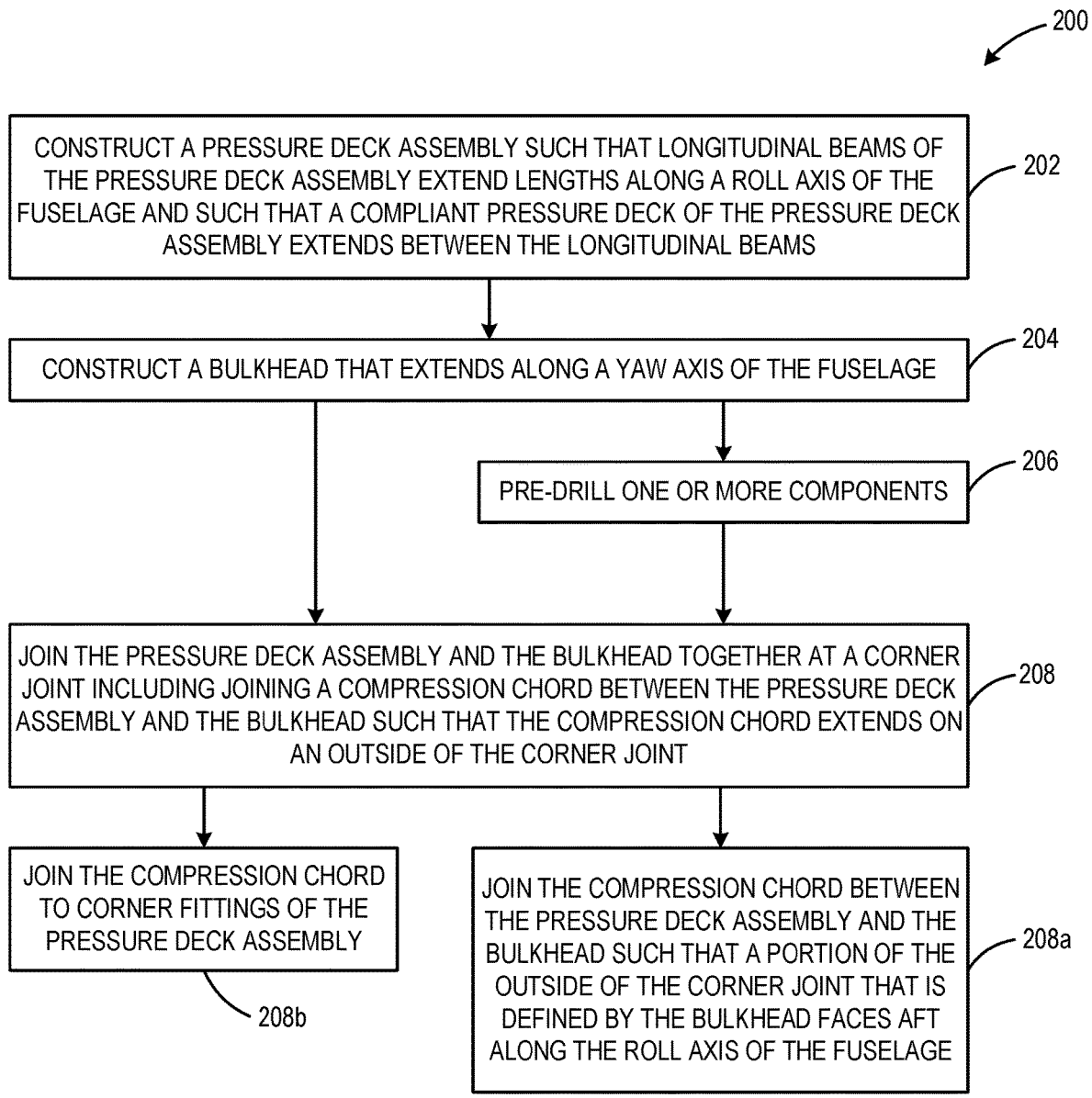
FIG. 6 is a flow chart illustrating a method for drilling a workpiece according to an implementation.

FIG. 6 is a flow chart illustrating a method 200 for fabricating a fuselage according to an implementation. The method 200 includes constructing, at 202, the pressure deck assembly 108 such that: (1) the plurality of longitudinal beams 118 of the pressure deck assembly 108 extend lengths along the roll axis 102 of the fuselage 100; and (2) a compliant pressure deck (e.g., the pressure deck 120) of the pressure deck assembly 108 extends between the plurality of longitudinal beams 118. At 204, the method 200 includes constructing the bulkhead 110 that extends along the yaw axis 106 of the fuselage 100.

At 208, the method 200 includes joining the pressure deck assembly 108 and the bulkhead 110 together at the corner joint 112 including joining the compression chord 146 between the pressure deck assembly 108 and the bulkhead 110 such that the compression chord 146 extends on the outside 164 of the corner joint 112. Optionally, the method 200 includes pre-drilling, at 206, one or more components (e.g., one or more components of the pressure deck assembly 108, the bulkhead 110, the compression chord 146, the corner joint 112, the fuselage 100, etc.) prior to joining at 208 the pressured deck assembly 108 and the bulkhead 110 together at the corner joint 112.

In some implementations, joining at 208 the compression chord 146 between the pressure deck assembly 108 and the bulkhead 110 includes joining, at 208a, the compression chord 145 between the pressure deck assembly 108 and the bulkhead 110 such that a portion of the outside 164 of the corner joint 112 that is defined by the bulkhead 110 faces aft along the roll axis 102 of the fuselage 100. Moreover, joining at 208 the compression chord 146 between the pressure deck assembly 108 and the bulkhead 110 includes joining, at 208b, the compression chord 146 to the plurality of corner fittings 128 of the pressure deck assembly 108 in some implementations of the method 200.

Referring now to FIG. 7, some examples of the disclosure are described in the context of an aircraft 300 that includes an airframe 302 having a fuselage 304. The fuselage 304 includes an interior 306. The airframe 302 includes a plurality of high-level systems 308. Examples of high-level systems 308 include one or more of a propulsion system 310, an electrical system 312, a hydraulic fluid system 314, a control system 316, and an environmental system 318. Any number of other systems can be included. Although an aerospace example is shown, the principles can be applied to other industries, such as, but not limited to, the automotive industry, the marine industry, and/or the like.

Figure 8:
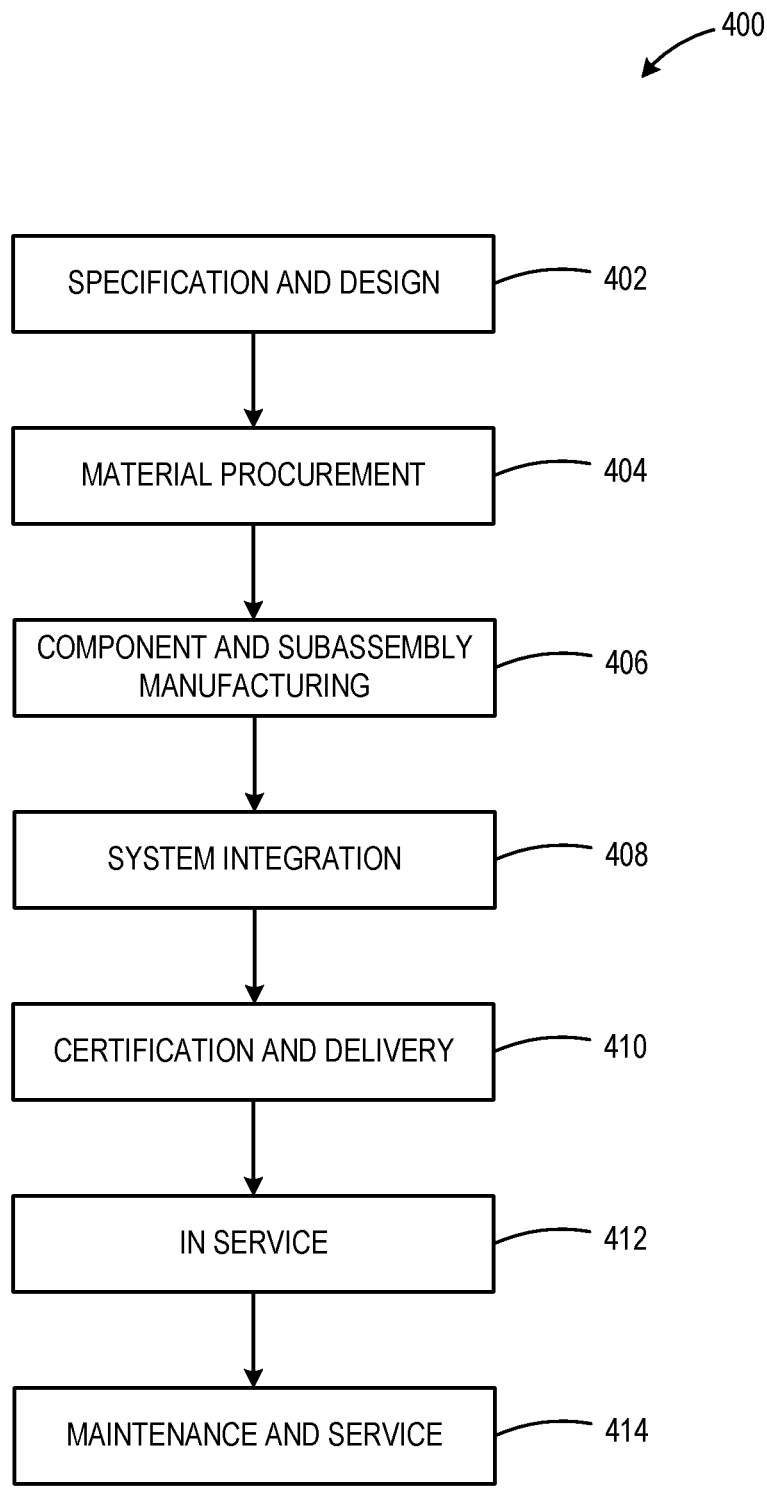
FIG. 8 is a block diagram of an implementation of an aircraft production and service methodology.

Examples of the disclosure can be described in the context of an aircraft manufacturing and service method 400 as shown in FIG. 8. During pre-production, illustrative method 400 can include specification and design 402 of an aircraft (e.g., the aircraft 300 shown in FIG. 7, etc.) and material procurement 404. During production, component and subassembly manufacturing 406 and system integration 408 of the aircraft take place. Thereafter, the aircraft can go through certification and delivery 410 to be placed in service 412. While in service by a customer, the aircraft is scheduled for routine maintenance and service 414 (which can also include modification, reconfiguration, refurbishment, and so on).

Each of the processes of the illustrative method 400 can be performed or carried out by a system integrator, a third party, and/or an operator (e.g., a customer, etc.). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as, but not limited to, the automotive industry, the marine industry, and/or the like.

Systems and methods shown or described herein can be employed during any one or more of the stages of the manufacturing and service method 400. For example, components or subassemblies corresponding to component and subassembly manufacturing 406 can be fabricated or manufactured in a manner similar to components or subassemblies produced while the aircraft is in service. Also, one or more aspects of the system, method, or combination thereof can be utilized during the production states of subassembly manufacturing 406 and system integration 408, for example, by substantially expediting assembly of or reducing the cost of the aircraft. Similarly, one or more aspects of the apparatus or method realizations, or a combination thereof, cab be utilized, for example and without limitation, while the aircraft is in service, e.g., maintenance and service 414.

Various implementations of the present disclosure provide a relatively smooth and/or relatively straight transverse load path through a corner joint between a pressure deck assembly and a bulkhead. Various implementations of the present disclosure enable the corner joint between a pressure deck assembly and a bulkhead to carry higher compression loads. Various implementations of the present disclosure increase the transverse stiffness of a corner joint between a pressure deck assembly and a bulkhead.

Various implementations of the present disclosure reduce or eliminate drilling operations performed during assembly of a corner joint between a bulkhead and a pressure deck assembly. Various implementations of the present disclosure reduce a part count of a corner joint between a bulkhead and a pressure deck assembly. Various implementations of the present disclosure reduce the weight of a corner joint between a bulkhead and a pressure deck assembly. Various implementations of the present disclosure reduce the time required to assemble a corner joint between a bulkhead and a pressure deck assembly. Various implementations of the present disclosure reduce the cost of assembling a corner joint between a bulkhead and a pressure deck assembly and therefore a fuselage. Various implementations of the present disclosure reduce the number of injuries that occur while joining a bulkhead and a pressure deck assembly together at a corner joint.

The following clauses describe further aspects:

Clause Set A:

A1. A fuselage for an aircraft, the fuselage comprising:
a pressure deck assembly extending along a roll axis of the fuselage, the pressure deck assembly comprising longitudinal beams and a pressure deck, the longitudinal beams extending lengths along the roll axis of the fuselage, the pressure deck extending between the longitudinal beams along the lengths of the longitudinal beams, the pressure deck being compliant along a pitch axis of the fuselage;
a bulkhead extending along a yaw axis of the fuselage, the bulkhead being joined to the pressure deck assembly at a corner joint; and
a compression chord extending a length along the pitch axis of the fuselage, wherein the compression chord is joined between the pressure deck assembly and the bulkhead at the corner joint such that the compression chord extends on an outside of the corner joint.

A2. The fuselage of clause A1, wherein a portion of the outside of the corner joint that is defined by the bulkhead faces aft along the roll axis of the fuselage such that the compression chord faces aft along the roll axis.

A3. The fuselage of clause A1, wherein the bulkhead comprises bulkhead beams and a web, the bulkhead beams extending lengths along the yaw axis of the fuselage, the web extending between the bulkhead beams along the lengths of the bulkhead beams, the web comprising an exterior side that defines a portion of the outside of the corner joint, wherein the compression chord extends on the exterior side of the web.

A4. The fuselage of clause A1, wherein the bulkhead comprises bulkhead beams and a web, the bulkhead beams extending lengths along the yaw axis of the fuselage, the web extending between the bulkhead beams along the lengths of the bulkhead beams, the web comprising an exterior side that defines a portion of the outside of the corner joint, wherein the compression chord is joined to the exterior side of the web.

A5. The fuselage of clause A1, wherein the pressure deck assembly comprises corner fittings that are joined to at least one of the longitudinal beams or the pressure deck, the compression chord being joined to the corner fittings.

A6. The fuselage of clause A1, wherein the pressure deck assembly comprises corner fittings that are joined to at least one of the longitudinal beams or the pressure deck, the bulkhead comprising bulkhead beams that extend lengths along the yaw axis of the fuselage, the corner fittings comprising blocks and straps that are discrete from the blocks, the compression chord being joined to the blocks of the corner fittings, the blocks of the corner fittings being joined to the bulkhead beams via the straps.

A7. The fuselage of clause A1, wherein the compression chord comprises an L-shape defined by first and second leg segments that extend at a non-parallel angle relative to each other.

A8. The fuselage of clause A1, wherein the compression chord comprises an L-shape defined by first and second leg segments that extend at a non-parallel angle relative to each other, the first leg segment extending outwardly from the second leg segment along the yaw axis, the second leg segment extending outwardly from the first leg segment along the roll axis.

A9. The fuselage of clause A1, wherein the bulkhead comprises a side fitting, the corner joint comprising at least one splice, and the compression chord extends the length from a first end portion and a second end portion, at least one of the first or second end portion of the compression chord being joined to the side fitting via the at least one splice.

A10. The fuselage of clause A1, wherein the pressure deck comprises a catenary shaped web.

A11. The fuselage of clause A1, wherein the fuselage comprises a wheel well and the bulkhead is a component of the wheel well.

A12. The fuselage of clause A1, wherein the fuselage comprises an elliptical cross-sectional shape that is wider-than-tall.

A13. The fuselage of clause A1, wherein the pressure deck assembly comprises corner fittings that are joined to at least one of the longitudinal beams or the pressure deck, and the length of the compression chord spans continuously across at least three corner fittings.

A14. The fuselage of clause A1, wherein the fuselage comprises a semi-monocoque fuselage.

Clause Set B:

B1. A fuselage for an aircraft, the fuselage comprising:
a pressure deck assembly extending along a roll axis of the fuselage, the pressure deck assembly comprising longitudinal beams, corner fittings, and a pressure deck, the longitudinal beams extending lengths along the roll axis of the fuselage, the corner fittings being joined to at least one of the longitudinal beams or the pressure deck, the pressure deck extending between the longitudinal beams along the lengths of the longitudinal beams, the pressure deck being compliant along a pitch axis of the fuselage;
a bulkhead extending along a yaw axis of the fuselage, the bulkhead being joined to the pressure deck assembly; and
a compression chord extending a length along the pitch axis of the fuselage, wherein the compression chord is joined between the pressure deck assembly and the bulkhead such that a load path of the compression chord has right of way over a load path of the corner fittings.

B2. The fuselage of clause B1, wherein the bulkhead is joined to the pressure deck assembly at a corner joint, the compression chord being joined between the pressure deck assembly and the bulkhead at the corner joint such that the compression chord extends on an outside of the corner joint.

B3. The fuselage of clause B1, wherein the length of the compression chord spans continuously across at least three corner fittings.

Clause Set C:

C1. A method for fabricating a fuselage comprising:
constructing a pressure deck assembly such that longitudinal beams of the pressure deck assembly extend lengths along a roll axis of the fuselage and such that a compliant pressure deck of the pressure deck assembly extends between the longitudinal beams;

constructing a bulkhead that extends along a yaw axis of the fuselage;

joining the pressure deck assembly and the bulkhead together at a corner joint; and joining a compression chord between the pressure deck assembly and the bulkhead at the corner joint such that the compression chord extends on an outside of the corner joint.

C2. The method of clause C1, wherein joining the compression chord between the pressure deck assembly and the bulkhead comprises joining the compression chord between the pressure deck assembly and the bulkhead such that a portion of the outside of the corner joint that is defined by the bulkhead faces aft along the roll axis of the fuselage.

C3. The method of clause 1, wherein joining the compression chord between the pressure deck assembly and the bulkhead comprises joining the compression chord to corner fittings of the pressure deck assembly.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A fuselage for an aircraft, the fuselage comprising:
a pressure deck assembly extending along a roll axis of the fuselage, the pressure deck assembly comprising longitudinal beams and a pressure deck, lengths of the longitudinal beams extending lengths along the roll axis of the fuselage, the pressure deck extending between the longitudinal beams along the lengths of the longitudinal beams, the pressure deck being compliant along a pitch axis of the fuselage;
a bulkhead extending along a yaw axis of the fuselage, the bulkhead being joined to the pressure deck assembly at a corner joint; and
a compression chord extending a length along the pitch axis of the fuselage, wherein the compression chord is joined between the pressure deck assembly and the bulkhead at the corner joint such that the compression chord extends on an outside of the corner joint, the outside of the corner joint defined by an exterior side of the pressure deck assembly and an exterior side of the bulkhead.

2. The fuselage of claim 1, wherein a portion of the outside of the corner joint that is defined by the bulkhead faces aft along the roll axis of the fuselage such that the compression chord faces aft along the roll axis.

3. The fuselage of claim 1, wherein the bulkhead comprises bulkhead beams and a web, the bulkhead beams extending lengths along the yaw axis of the fuselage, the web extending between the bulkhead beams along the lengths of the bulkhead beams, the web comprising an exterior side that defines a portion of the outside of the corner joint, wherein the compression chord extends on the exterior side of the web.

4. The fuselage of claim 1, wherein the bulkhead comprises bulkhead beams and a web, the bulkhead beams extending lengths along the yaw axis of the fuselage, the web extending between the bulkhead beams along the lengths of the bulkhead beams, the web comprising an exterior side that defines a portion of the outside of the corner joint, wherein the compression chord is joined to the exterior side of the web.

5. The fuselage of claim 1, wherein the pressure deck assembly comprises corner fittings that are joined to the longitudinal beams, the compression chord being joined to the corner fittings.

6. The fuselage of claim 1, wherein the pressure deck assembly comprises corner fittings that are joined to the longitudinal beams, the bulkhead comprising bulkhead beams that extend lengths along the yaw axis of the fuselage, the corner fittings comprising blocks and straps that are discrete from the blocks, the compression chord being joined to the blocks of the corner fittings, the blocks of the corner fittings being joined to the bulkhead beams via the straps.

7. The fuselage of claim 1, wherein the compression chord comprises an L-shape defined by first and second leg segments that extend at a non-parallel angle relative to each other.

8. The fuselage of claim 1, wherein the compression chord comprises an L-shape defined by first and second leg segments that extend at a non-parallel angle relative to each other, the first leg segment extending outwardly from the second leg segment along the yaw axis, the second leg segment extending outwardly from the first leg segment along the roll axis.

9. The fuselage of claim 1, wherein the bulkhead comprises a side fitting, the corner joint comprises at least one splice, and the compression chord extends the length from a first end portion and a second end portion, at least one of the first or second end portion of the compression chord being joined to the side fitting via the at least one splice.

10. The fuselage of claim 1, wherein the pressure deck comprises a catenary shaped web.

11. The fuselage of claim 1, wherein the fuselage comprises a wheel well and the bulkhead is a component of the wheel well.

12. The fuselage of claim 1, wherein the fuselage comprises an elliptical cross-sectional shape that is wider-than-tall.

13. The fuselage of claim 1, wherein the pressure deck assembly comprises corner fittings that are joined to the longitudinal beams, and the length of the compression chord spans continuously across at least three corner fittings.

14. The fuselage of claim 1, wherein the fuselage comprises a semi-monocoque fuselage.

15. A fuselage for an aircraft, the fuselage comprising:
a pressure deck assembly extending along a roll axis of the fuselage, the pressure deck assembly comprising longitudinal beams, corner fittings, and a pressure deck, the longitudinal beams extending lengths along the roll axis of the fuselage, the corner fittings being joined to the longitudinal beams, the pressure deck extending between the longitudinal beams along the lengths of the longitudinal beams, the pressure deck being compliant along a pitch axis of the fuselage;
a bulkhead extending along a yaw axis of the fuselage, the bulkhead being joined to the pressure deck assembly; and
a compression chord extending a length along the pitch axis of the fuselage, wherein the compression chord is joined between the pressure deck assembly and the bulkhead such that a load path of the compression chord has right of way over a load path of the corner fittings and such that the compression chord extends on an outside of the corner joint, the outside of the corner joint defined by an exterior side of the pressure deck assembly and an exterior side of the bulkhead.

16. The fuselage of claim 15, wherein the bulkhead is joined to the pressure deck assembly at a corner joint, the compression chord being joined between the pressure deck assembly and the bulkhead at the corner joint such that the compression chord extends on an outside of the corner joint.

17. The fuselage of claim 15, wherein the length of the compression chord spans continuously across at least three corner fittings.

18. A method for fabricating a fuselage comprising:
constructing a pressure deck assembly such that longitudinal beams of the pressure deck assembly extend lengths along a roll axis of the fuselage and such that a compliant pressure deck of the pressure deck assembly extends between the longitudinal beams;
constructing a bulkhead that extends along a yaw axis of the fuselage;
joining the pressure deck assembly and the bulkhead together at a corner joint; and
joining a compression chord between the pressure deck assembly and the bulkhead at the corner joint such that the compression chord extends on an outside of the corner joint the outside of the corner joint defined by an exterior side of the pressure deck assembly and an exterior side of the bulkhead.

19. The method of claim 18, wherein joining the compression chord between the pressure deck assembly and the bulkhead comprises joining the compression chord between the pressure deck assembly and the bulkhead such that a portion of the outside of the corner joint that is defined by the bulkhead faces aft along the roll axis of the fuselage.

20. The method of claim 18, wherein joining the compression chord between the pressure deck assembly and the bulkhead comprises joining the compression chord to corner fittings of the pressure deck assembly.

* * * * *